(12) United States Patent
Dunbar

(10) Patent No.: US 8,832,991 B1
(45) Date of Patent: Sep. 16, 2014

(54) FISHING LURE WITH SPINNING FLOAT

(76) Inventor: John Michael Dunbar, Baker, LA (US)

( * ) Notice: Subject to any disclaimer, the term of this patent is extended or adjusted under 35 U.S.C. 154(b) by 479 days.

(21) Appl. No.: 13/235,126

(22) Filed: Sep. 16, 2011

Related U.S. Application Data

(60) Provisional application No. 61/383,578, filed on Sep. 16, 2010.

(51) Int. Cl.
*A01K 85/00* (2006.01)

(52) U.S. Cl.
USPC .............................. 43/42; 43/42.19; 43/42.2

(58) Field of Classification Search
USPC ................ 43/42, 42.19, 42.2, 42.35
See application file for complete search history.

(56) References Cited

U.S. PATENT DOCUMENTS

| D162,741 | S | * | 4/1951 | Lawhon | D22/128 |
| 2,885,818 | A | * | 5/1959 | Frederiksen, Sr. | 43/42.06 |
| 2,886,913 | A | * | 5/1959 | Stanley | 43/42.19 |
| 4,718,191 | A | * | 1/1988 | Gentry | 43/42.13 |
| 4,793,089 | A | * | 12/1988 | Long et al. | 43/42.13 |
| 4,823,500 | A | * | 4/1989 | Shindeldecker | 43/42.13 |
| 5,505,015 | A | * | 4/1996 | Delricco | 43/42.13 |
| 5,564,218 | A | * | 10/1996 | Kato | 43/42.13 |
| 5,987,805 | A | * | 11/1999 | Laney | 43/42.13 |
| 6,591,543 | B2 | * | 7/2003 | Sabine | 43/42.11 |
| 2008/0098641 | A1 | * | 5/2008 | Brewer | 43/43.13 |

* cited by examiner

*Primary Examiner* — Christopher P Ellis
(74) *Attorney, Agent, or Firm* — Jones Walker, LLP

(57) ABSTRACT

In the fishing lure art there is a need for a lure that remains near and parallel to the surface of the water not only when the lure is reeled in by a fisherman, but also when the lure is stationary or left to the whims of the water's current. Described are lures having a floating body that is incorporated into a non-linear lure design. Some arrangements of the invention comprise fins on the floating body to allow the lure to generate noise as it moves through the water. Still other arrangements of the invention have a ballast that adds weight and stability to the lower portion of the lure.

20 Claims, 10 Drawing Sheets

FISHING LURE WITH SPINNING FLOAT

CROSS-REFERENCE TO RELATED APPLICATION

This application claims the benefit of U.S. Provisional Application No. 61/383,578, filed Sep. 16, 2010, which is hereby incorporated by reference.

SUMMARY

Fishermen have long utilized specialized lures to attract fish. Some lures attract fish by using a noise-generating spinning component. Others use spinning components to create drag when the lure is reeled in, thereby bringing the bait near the surface of the water. In a non-linear arrangement, the hook is connected to the spinning component with a bent wire frame with a hook attached to one end of the frame and the spinning component attached to the other. In a linear arrangement, a spinner and hook are attached to a line or wire in series.

A problem with the non-linear design is that if the fisherman stops reeling in the lure, then the lure quickly begins to sink. This can be partially remedied by using a linear arrangement with a floating component. However, a problem with the linear arrangement is that fish will strike the noise-making spinning component and sometimes miss the baited hook that trails behind. Both designs suffer from issues of twisting or tangling fishing line because of the spinning action of the lure.

The fishing lure, embodiments of which are described below, incorporate a floating body in a non-linear design. In particular, some embodiments are arranged such that the lure can float in an upright position near or on the water's surface regardless of whether the lure is being reeled in. This relieves the fisherman from the need to continuously reel in the lure in order to have the lure remain near the surface of the water. Other embodiments incorporate fins into the floating body, or have a separate spinning component in addition to a floating body, so that the lure generates noise as it moves through the water. Still other embodiments incorporate a ballast that adds weight and/or stability to the lower portion of the lure and can help the lure remain upright and substantially parallel to the surface in the water.

Figure 1:
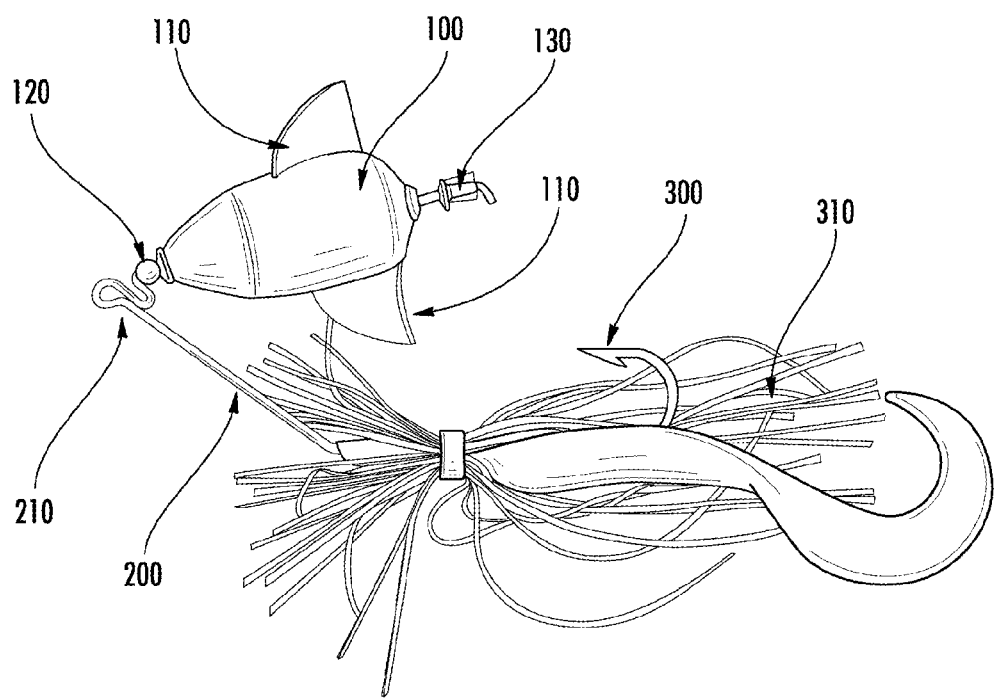
FIG. 1 is a side elevation view of a fishing lure.

PARTS LIST 100 body
110 fin
120 front cap
130 rear cap
200 wire frame
210 bend
220 clip
300 hook
310 bait
400 ballast
410 wing

DETAILED DESCRIPTION

Figure 2:
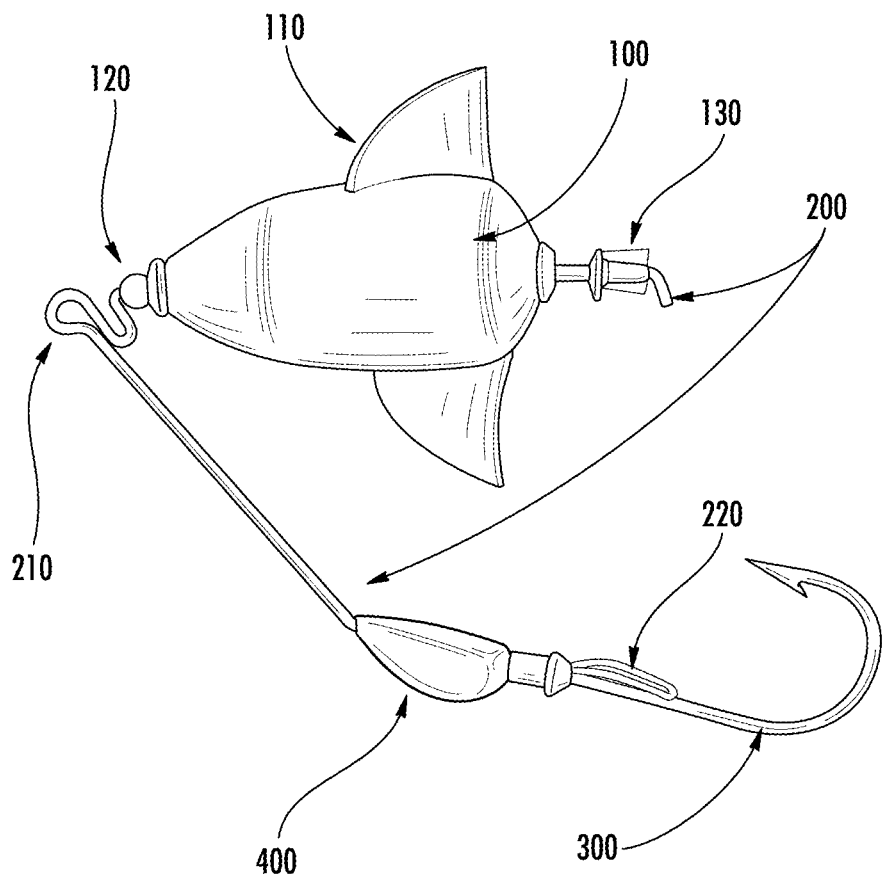
FIG. 2 is a side elevation view of a fishing lure.
Figure 3:
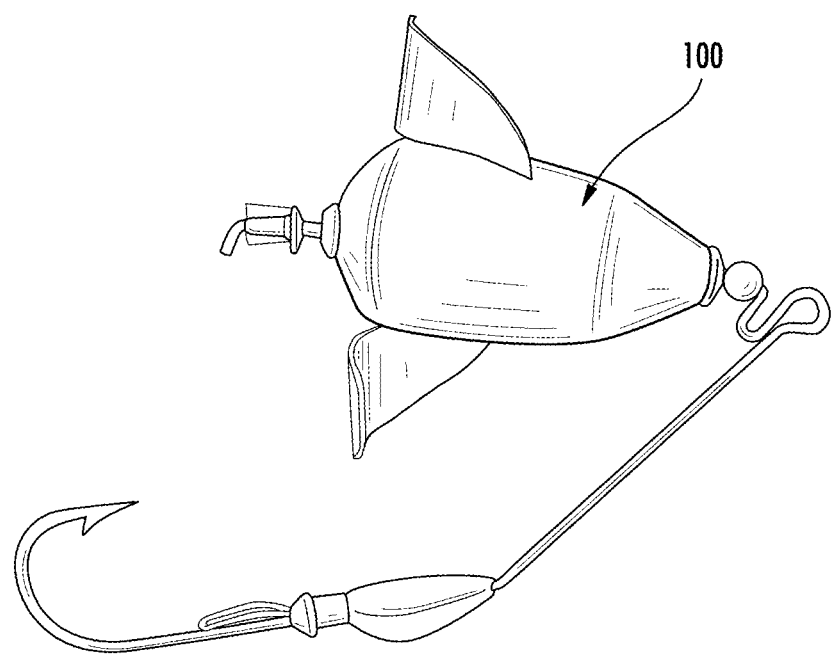
FIG. 3 is a side elevation view of the fishing lure of FIG. 2.
Figure 4:
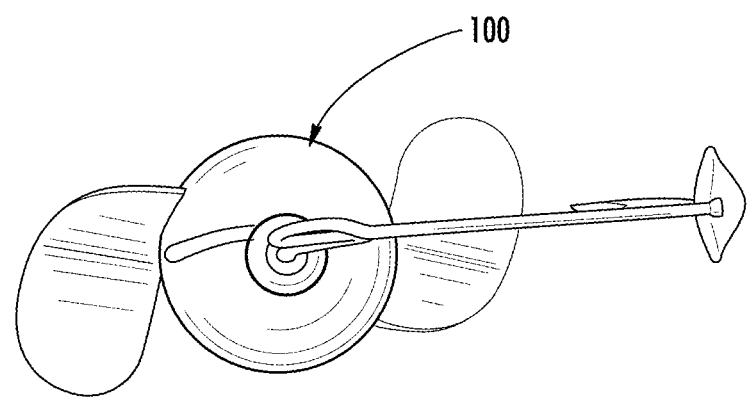
FIG. 4 is a front elevation view of the fishing lure of FIG. 2.
Figure 5:
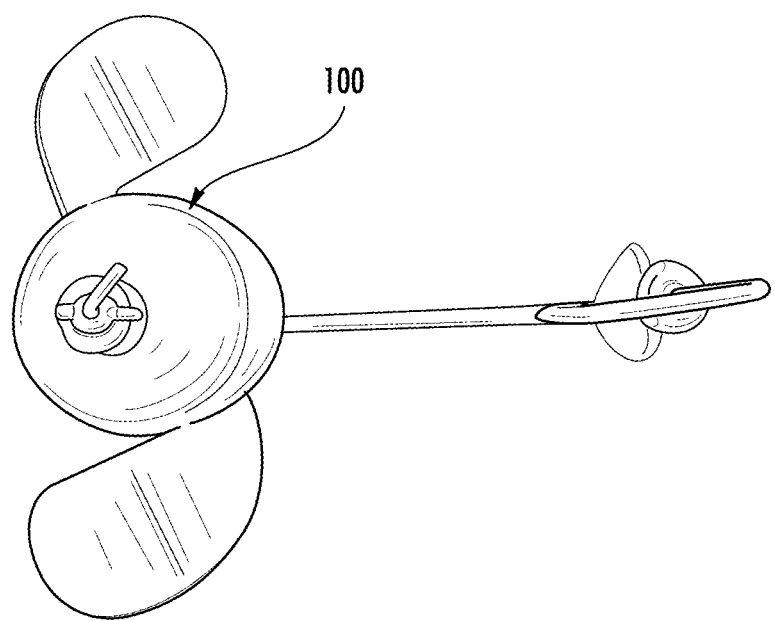
FIG. 5 is a back elevation view of the fishing lure of FIG. 2.
Figure 6:
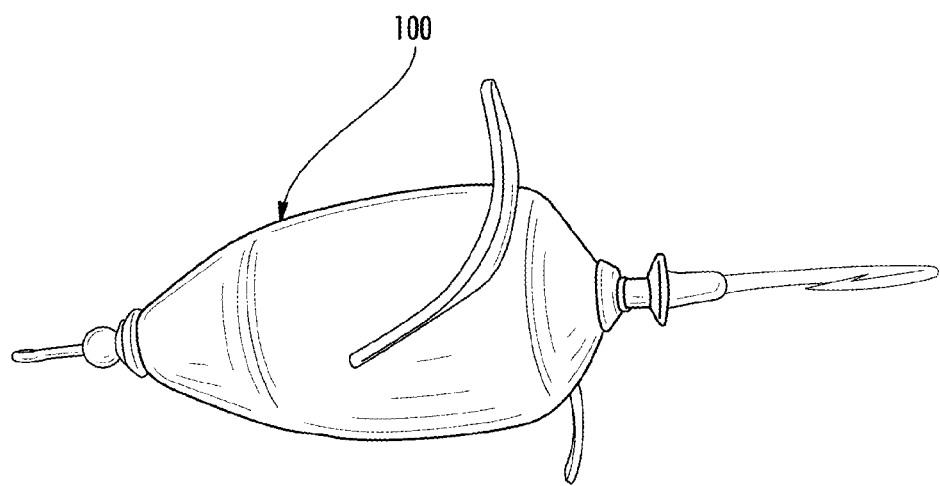
FIG. 6 is a top elevation view of the fishing lure of FIG. 2.
Figure 7:
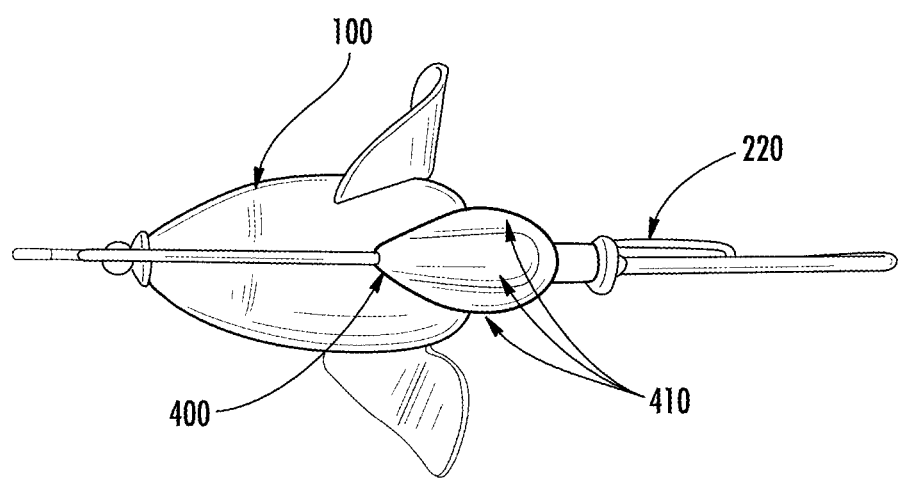
FIG. 7 is a bottom elevation view of the fishing lure of FIG. 2.
Figure 8:
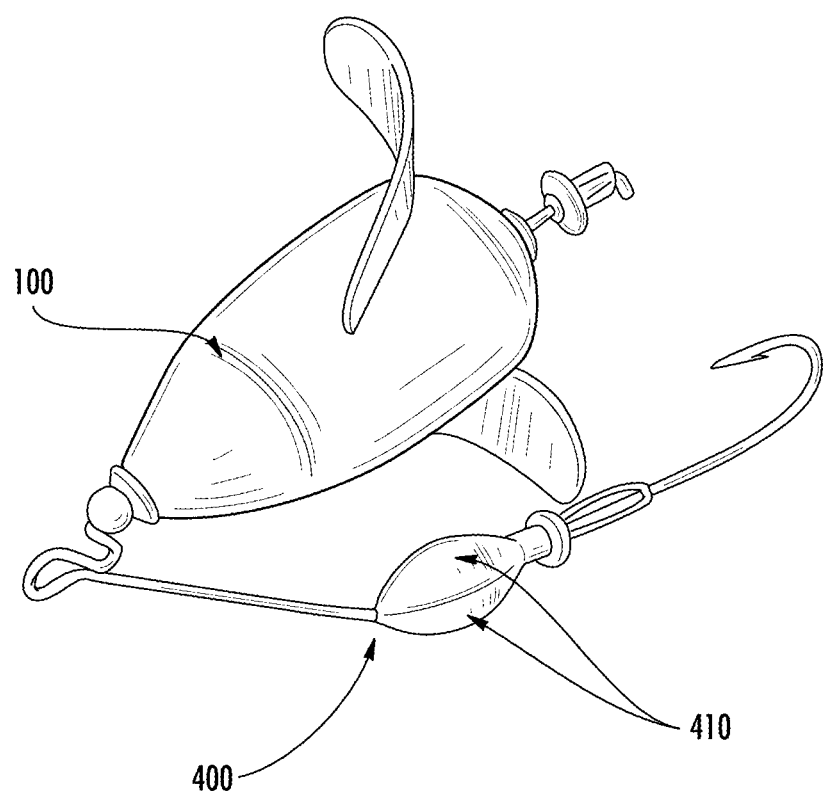
FIG. 8 is a prospective view of the fishing lure of FIG. 2.

As shown in the accompanying drawings, an embodiment of the invention is a floating fishing lure. As shown in FIGS. 1 and 2, the lure comprises a body 100 and a hook 300. FIGS. 3 through 8 show different views of the fishing lure and body 100. In this embodiment, the body 100 is attached to the hook 300 through a wire frame 200. The body 100 preferably has radial symmetry and a central axis passing through the center of the body 100. The wire frame 200 extends within and through the central axis of the body 100, thereby allowing the body 100 to rotate about its central axis. In order to facilitate the spinning action of the body 100, a front cap 120 and rear cap 130 are attached to wire frame 200 in front and behind the body 100. In an embodiment, the body 100 comprises a sleeve that is inserted within a cavity of the body 100 that is collinear with the central axis of rotation of the body 100. The sleeve is preferably made out of aluminum and fixedly attached to the body 100 by epoxy or other fixing means. In preferable embodiments, the front cap 120 protects the front of the body 100 and the sleeve. A preferable material for the wire frame 200 is stainless steel, however other sufficiently rigid materials, both rust resistant and not, may be suitable, including steel, aluminum, tin, bismuth, hardened plastic, and the like.

In the embodiment shown, the body 100 comprises two fins 110. Other embodiments of the invention may have additional or fewer or no fins. Fins 110 are preferably attached to the body 100 at about a 30 degree angle to about a 70 degree angle from the central axis of the body 100. More preferably, fins 110 are attached at about a 60 degree angle form the central axis of the body 100. A preferable material for fins 110 is aluminum. Other embodiments may have a spinning component separate from the body 100. Still other embodiments may have multiple floating components that may collectively comprise a body 100.

The body 100 is preferably comprised of one or more materials that are less dense than water such that the body 100 floats when placed in water. In more preferable embodiments, the material used for the body 100 is Balsa wood, however many other buoyant materials are suitable for use as body 100 materials, including cork, foam, or plastic or other synthetic products. For materials that may become waterlogged, such as certain types of wood, the sleeve can act to seal the cavity of the body 100 to help prevent the material comprising the body 100 from becoming waterlogged. Some embodiments of the body 100 comprise a teardrop shape. Preferred embodiments of the body 100 comprise a bullet shape having a diameter at the trailing end of the body 100 wherein the diameter tapers toward the leading end of the body 100.

In preferable embodiments, the buoyancy of the body 100 is greater than or equal to the weight of the entire lure, including the weight of the body 100 itself. This allows the floating fishing lure to remain at or near the surface of the water by virtue of the buoyancy of the body 100 instead of relying on drag forces as the lure is reeled in.

Preferable embodiments position the body 100 and the hook 300 in a non-linear arrangement. One of many ways to achieve this arrangement is by using a wire frame 200 with a bend 210. In the embodiment shown, an R-shaped bend 210 is utilized; however, there are many other suitable bend 210 shapes such as a U-shaped bend or a loop in the wire frame 200 itself. The bend 210 preferably positions the hook 300 below the body 100 as the lure would sit upright in the water (much like the way the lure is positioned in FIGS. 6 and 8). In preferable embodiments, a fisherman attaches a fishing line to the lure at the bend 210. This preferable arrangement allows the hook 300 to remain submerged near the water's surface while the buoyant body 100 maintains the lure in an upright position.

As used in this disclosure, "linear" and "non-linear" are used with reference to the central axis of the body 100. For example, the front cap 120 and rear cap 130 are in a linear arrangement with the body 100, but the clip 220, hook 300, bait 310, and ballast 400 are non-linear relative to the body 100. The bend 210 may be formed such that the site at which a fisherman attaches a fishing line to the lure may be linearly or non-linearly positioned, depending on the shape and position of the bend 210. In preferred embodiments, an R-shaped bend 210 is employed to provide a substantially linear fishing line attachment point.

Figure 9:
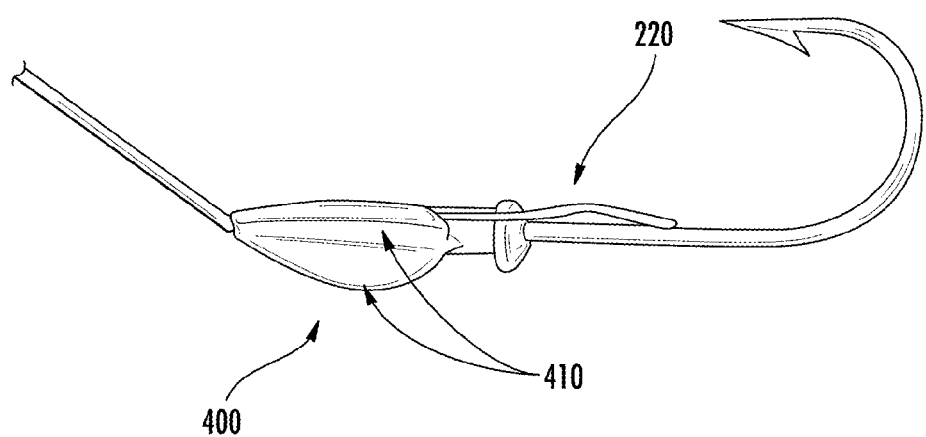
FIG. 9 is a prospective view of the fishing lure of FIG. 2.
Figure 10:
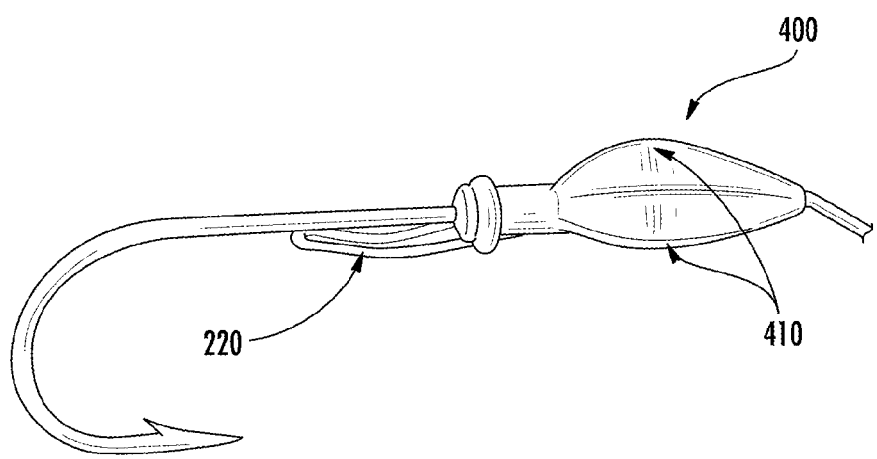
FIG. 10 is a prospective view of the fishing lure of FIG. 2.

As shown, the wire frame 200 is attached to the hook 300. Although hidden from view in FIG. 1, a clip 220 resiliently retains the bait 310 against the base of the hook 300. The clip 220 helps to prevent bait 310 from becoming dislodged from the hook as the lure passes through the water or when fish bite the bait 310 but not the hook 300. Enlarged views of the clip 220 may be found in FIGS. 9 and 10. The clip preferably has two prongs in a loop arrangement. In preferred arrangement shown, the terminal end of the wire frame 200 passes through the ballast 400 and turns back on itself in a loop to act as the clip 220. Other embodiments may have a clip 220 that is separate from the wire frame 200. Still other embodiments may have a clip 220 attached to or incorporated into the hook 300 itself. All such clip arrangements and others are considered to be within the scope of this disclosure.

Turning now to FIGS. 7-10, the embodiments show a ballast 400. The ballast may add weight to or stabilize the non-linear portion of the lure. In preferable embodiments the ballast 400 both adds weight to and stabilizes the non-linear portion of the lure, i.e., the part of the lure that one wishes to remain submerged in the water. Some embodiments may use a dense hook material in lieu of a separate ballast member. In preferred embodiments, the ballast 400 has a plurality of wings 410 to further aid in stabilization, however any shape that provides sufficient weight to the lure may be suitable. Other embodiments of a ballast 400 may not have any wings 410. In the embodiment shown, the ballast 400 is used as the means of attachment between the wire frame 200 and the hook 300. A preferable ballast 400 material is tin. In other embodiments ballast materials may be lead or bismuth or other dense materials. In a non-limiting example only, the ballast 400 preferably consists of three quarters of the total weight of the frame 200, hook 300, and the ballast 400. In still more preferable embodiments the total weight of the frame 200, hook 300, and ballast 400 is ¼ ounce and the weight of the ballast 400 is 3/16 ounce. If tin is the material used for the ballast 400, then a ¼ ounce sized lead mold is preferable. One of ordinary skill in the fishing lure art may create a larger or smaller lure without undue experimentation using the components described herein and would appreciate that such lures would be within the scope of this disclosure. In another non-limiting example, the ballast 400 may weigh as little as ⅛ ounce or less.

The hook 300 is a typical fishing hook that may be constructed out of any traditional fish-hook material, such as steel or stainless steel. In preferable embodiments, the sharp, curved end of the hook 300 is positioned toward the body 100 of the lure to avoid snagging on debris as the lure travels through the water.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing from this application be limited only by the scope of the appended claims.

I claim:

1. A floating fishing lure comprising:
   a. a body having a density less than water;
   b. a hook;
   c. a wire frame having a first section and a second section, wherein the first section and the second section are separated by a bend;
   d. wherein the first section extends at least partially through the body; and
   e. the second section is attached to the hook.

2. The floating fishing lure of claim 1, wherein the body further comprises one or more curved fins.

3. The floating fishing lure of claim 1, wherein the body is radially symmetrical.

4. The floating fishing lure of claim 1, wherein one of the materials comprising the body is balsa wood.

5. The floating fishing lure of claim 1, wherein the body is teardrop shaped.

6. The floating fishing lure of claim 1, wherein the body further comprises a central axis, a cavity that is co-linear with the central axis, and the first section is attached to the body such that the first section extends through the cavity to permit the body to rotate about the central axis.

7. The floating fishing lure of claim 1, wherein the second section further comprises a clip.

8. The floating fishing lure of claim 1, further comprising a ballast member and wherein the ballast member is directly attached to the hook.

9. The floating fishing lure of claim 1, further comprising a ballast member and wherein the ballast member is directly attached to the second section.

10. The floating fishing lure of claim 1, further comprising a ballast member and wherein the ballast member is directly attached to the hook and directly attached to the second section.

11. The floating fishing lure of claim 8, wherein the ballast member further comprises one or more wings.

12. The floating fishing lure of claim 8, wherein the ballast member comprises lead.

13. The floating fishing lure of claim 1, wherein the bend forms an acute angle from the first section relative to the second section.

14. The floating fishing lure of claim 1, wherein the bend is an R-shape.

15. The floating fishing lure of claim 1, wherein the buoyancy of the body is greater than or equal to the weight of the floating fishing lure.

16. The floating fishing lure of claim 1, wherein the body further comprises a diameter and the distance from the body to the hook is no greater than two body diameters.

17. The floating fishing lure of claim 7, wherein the clip comprises a loop.

18. The floating fishing lure of claim 1, wherein the hook further comprises a curved, sharp end and a straight, base end and wherein the hook is attached such that the curved, sharp end is turned toward the body.

19. The floating fishing lure of claim 6, further comprising:
a ballast member connected to the frame such that the ballast member is in non-linearly positioned relative to the central axis of the body.

20. The floating fishing lure of claim 6, further comprising:
a plane bisecting the body through the central axis; and
a ballast member connected to the body such that the ballast member intersects the plane but not the central axis.

* * * * *